(12) United States Patent
Lin

(10) Patent No.: US 6,778,166 B2
(45) Date of Patent: Aug. 17, 2004

(54) KEYLESS POINTER INPUT DEVICE

(76) Inventor: Hao-Fong Lin, 4F., 416, Sec. 4, Chung Yung N. Road, Pei ou, Taipei (TW)

( * ) Notice: Subject to any disclaimer, the term of this patent is extended or adjusted under 35 U.S.C. 154(b) by 193 days.

(21) Appl. No.: 09/983,987

(22) Filed: Oct. 26, 2001

(65) Prior Publication Data
US 2003/0080936 A1 May 1, 2003

(51) Int. Cl.$^7$ ................................................. G09G 5/08
(52) U.S. Cl. .................................. 345/161; 74/471 XY
(58) Field of Search ................................ 345/156–163; 341/20; 74/471, 471 R, 471 XY

(56) References Cited

U.S. PATENT DOCUMENTS

| | | | | |
|---|---|---|---|---|
| 5,396,266 A | * | 3/1995 | Brimhall | 345/161 |
| 6,222,525 B1 | * | 4/2001 | Armstrong | 345/161 |
| 6,259,382 B1 | * | 7/2001 | Rosenberg | 341/20 |
| 6,437,771 B1 | * | 8/2002 | Rosenberg et al. | 345/156 |
| 6,476,795 B1 | * | 11/2002 | Derocher et al. | 345/163 |
| 6,556,150 B1 | * | 4/2003 | McLoone et al. | 341/20 |
| 6,580,418 B1 | * | 6/2003 | Grome et al. | 345/161 |

* cited by examiner

Primary Examiner—Dennis-Doon Chow
Assistant Examiner—Srilakshmi K. Kumar
(74) Attorney, Agent, or Firm—Troxell Law Office PLLC

(57) ABSTRACT

The present invention is related to a keyless pointer input device, especially to a pointer input device including a control circuit, an optical sensor for detecting the movement of the pointer device and generating respective displacement, a ball shaft type key control element, a bottom plate, and an upper cover casing capable of being moved slightly. Then main parts can be assembled to the upper cover casing. The keyless pointer input device of the present invention is keyless on the appearance of the device. Therefore, the keyless pointer input device can be integral formed with a seat. The ball shaft type key control element is used to cause key signals to be generated by moving the upper cover casing.

4 Claims, 8 Drawing Sheets

KEYLESS POINTER INPUT DEVICE

BACKGROUND OF THE INVENTION

1. Field of the Invention

The present invention is related to a keyless pointer input device, especially to a pointer input device including a control circuit, an optical sensor for detecting the movement of the pointer device and generating respective displacement, a ball shaft type key control element, a bottom plate, and an upper cover casing capable of being moved slightly. Then main parts can be assembled to the upper cover casing. The keyless pointer input device of the present invention is keyless on the appearance of the device. Therefore, the keyless pointer input device can be integral formed with a seat. The ball shaft type key control element is used to generate key signals by moving the upper cover casing.

2. Description of the Related Art

In current computer age, computers have become a popular device and have been widely used. Moreover, the graphic user interface (GUI) is a necessary device for controlling the movement of icons so as to control the operations of a computer. Thus, currently, some application programs, Internet, visual realities, etc. adapts GUI as an unique standard. Furthermore, trace balls, mice, and other pointer devices become necessary devices for operation the interface.

Referring to FIG. 1, a prior art pointer input device, for example, a mouse is illustrated. The appearances of conventional pointer devices are similar and dull. Keys are disposed at proper positions for being pressed by fingers directly. However, this will induce some injury to fingers. Furthermore, it is possible the muscles of finger will irritate and inflate so as to press the nerve tunnel, such as carpal tunnel. This is a general disease in the computer age.

Accordingly, the primary object of the present invention is to provide a keyless pointer input device, wherein no key is formed on the appearance of a pointer input device. The switching of the key is unnecessary to be operated by fingers. Therefore, the keyless pointer input device has a compact size and can be designed as a decoration with a desired shape, as illustrated in FIG. 2.

Other than improving the defects in the portion pointer device, by the present invention, the outlook of the pointer device becomes interest. By matching of various parts, a keyless pointer input device is formed. Furthermore, the present invention has a compact volume and no key presents on the outlook. The present invention may be matched with a decoration so as to present various interesting outlooks. The dull outlook in the conventional mouse is improved.

The various objects and advantages of the present invention will be more readily understood from the following detailed description when read in conjunction with the appended drawing.

DETAILED DESCRIPTION OF THE INVENTION

In order that those skilled in the art can further understand the present invention, a description will be described in the following in details. However, these descriptions and the appended drawings are only used to cause those skilled in the art to understand the objects, features, and characteristics of the present invention, but not to be used to confine the scope and spirit of the present invention defined in the appended claims.

Figure 3:
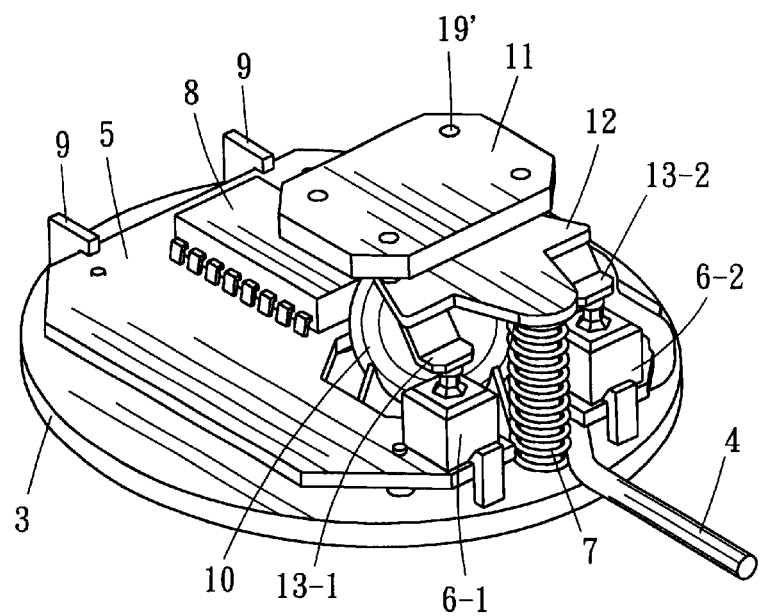
FIG. 3 is an assembled structural view of the keyless pointer input device of the present invention.
Figure 4:
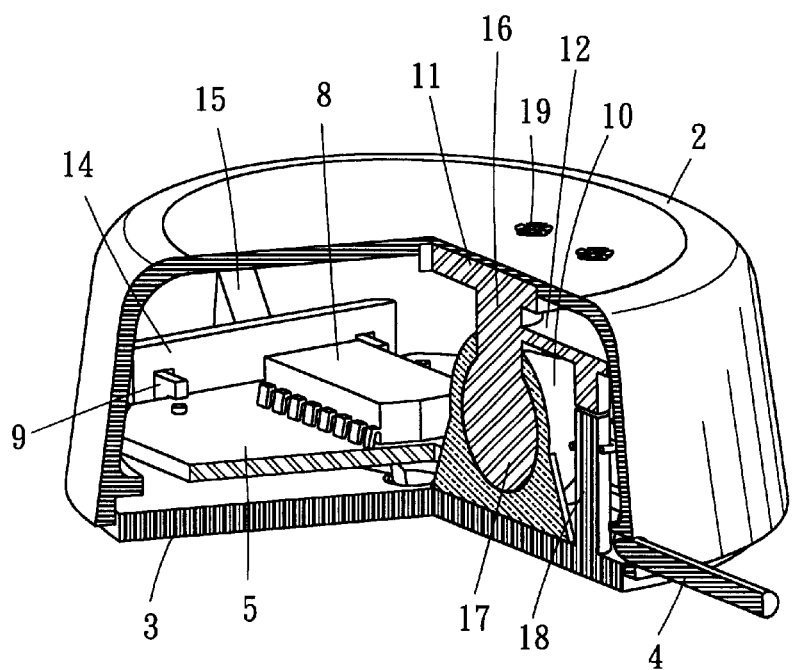
FIG. 4 is a partial cross section view of the keyless pointer input device of the present invention.

Referring to FIGS. 3 and 4, an assembled structure view and partial schematic view of the keyless pointer input device of the present invention are illustrated. The keyless pointer input device of the present invention many includes a bottom plate 3 and an upper cover casing 2. Other parts of the keyless pointer input device is included in the casing 2, which mainly includes a main control circuit 5 for processing pointer signal. It is connected to a host through a signal transmission line 4. An optical sensor 8 is used to detect the movement of the pointer device. Therefore, a corresponding cursor displacement signal is provided to the control circuit 5. A ball shaft type key control element is installed at a proper position of the bottom plate 3 for switching the key.

Figure 5:
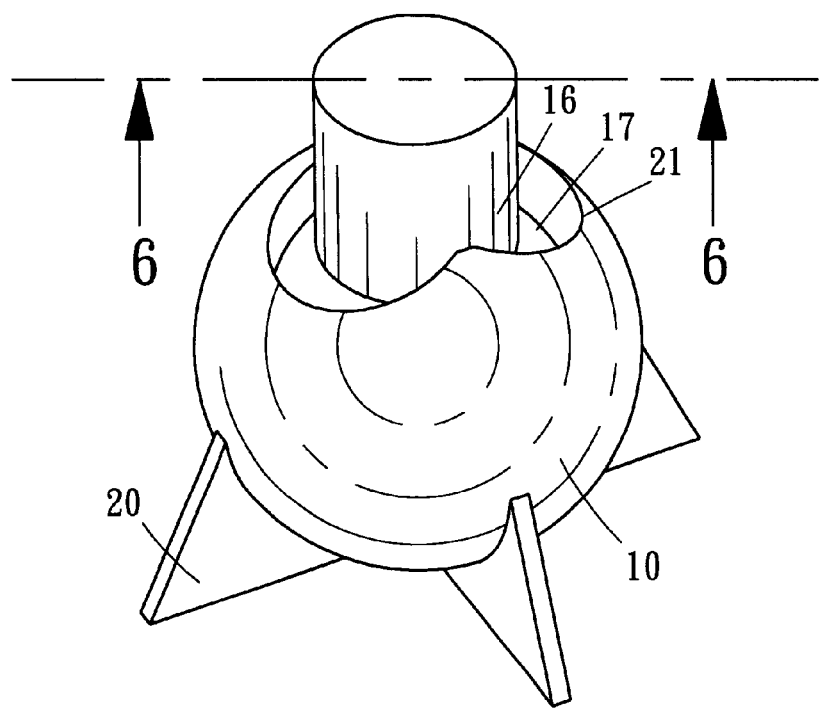
FIG. 5 is a perspective view of the ball shaft type key control element.
Figure 6:
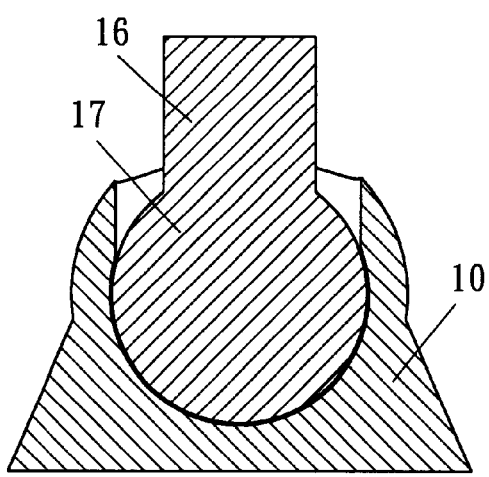
FIG. 6 is a cross section view of the keyless pointer input device of the present invention.

The perspective view of the structure of the ball shaft type key control element is illustrated in FIG. 5, and the cross section view thereof is illustrated in FIG. 6. The ball shaft type key control element includes a ball shaft seat 10 in which a ball shaft 17 is installed. The ball shaft 17 may be engaged to the seat 10 and may rotate freely around the ball shaft center. A projected ball shaft arm 16 is installed on the ball shaft 17. The ball shaft 17 and the ball shaft arm 16 may move within a range confined by a notch 21 in the ball shaft seat 10. The lower side of the ball shaft seat 10 is installed with a fixing rib 20. Thereby, it can be steadily placed on the bottom plate 3.

A proper restoring arm 12 is installed on the ball shaft arm 16. The lower front end has a round protrusion which is capable of being coupled to a restoring spring fixing post 18. The restoring spring 7 encloses the post. Thereby, the restoring spring 7 is fixed thereon. Through the elastic force of the restoring spring 7, the ball shaft arm 16 shifted due to a pressed key is pushed back to a predetermined position. As shown in the FIGS. 3 and 4.

The restoring arms 12 are installed with touching plates 13-1, 13-2 at positions with respect to the ball shaft arm 16 for pressing and releasing key switches 6-1 and 6-2. The top of the ball shaft arm 16 has an upper cover fixing piece 11. The four corners thereof are formed with screw holes 19'. Thereby, the upper cover casing 2 can be screwed by screws 19. The upper cover casing 2 covers on the bottom plate 3. The upper cover casing 2 has a rib 15. Upper cover positioning plate 14 is extended from the rib 15. A positioning hook 9 is formed with a notch for being buckled with the upper cover positioning plate 14. Thus, the upper cover casing 2 is positioned. Therefore, the upper cover casing 2 movably covers the bottom plate 3.

The upper cover casing 2 covers the bottom plate 3 by fixing to the upper cover fixing piece 11. Therefore, the upper cover casing 2 may shift and swing around the ball shaft center so as to touch the key switches 6-1, 6-2 through the touching plate 13-1, and touching plate 13-2 to generate key signals.

Figure 7A:
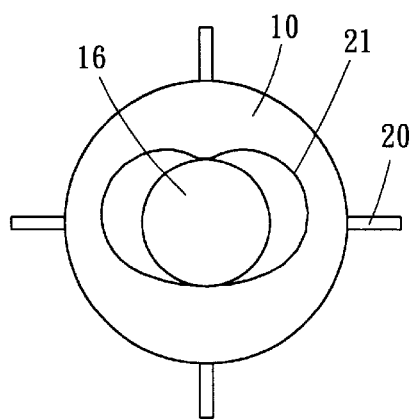
FIGS. 7A, 7B and 7C are schematic views showing the swinging position of the present invention.
Figure 7B:
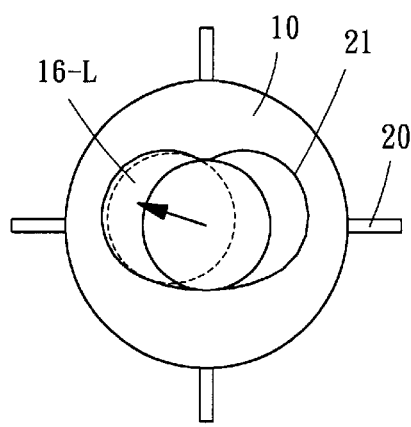
Figure 7C:
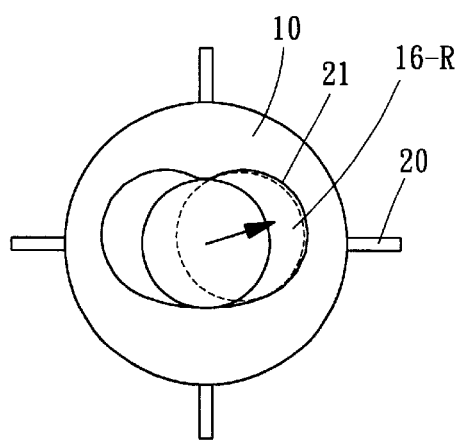

Further, referring to FIGS. 7A to 7C, the schematic view showing various movement of the of the ball shaft arm of the present invention. A notch 21 for confining swinging is formed on the ball shaft seat 10. Thereby, the ball shaft arm 16 is confined in the notch for swinging within a proper direction. The swinging confining notch 21 is formed so as to confine a key to swing within a proper angle. Thereby, the ball shaft arm 16 is confined within the left and right sides 16-L and 16-R, as illustrated in FIGS. 7B and 7C. Thereby, the key switch at any position can be touched. When no key is operated, the ball shaft arm 16 is positioned at a middle position, as shown in the FIG. 7A.

Figure 8:
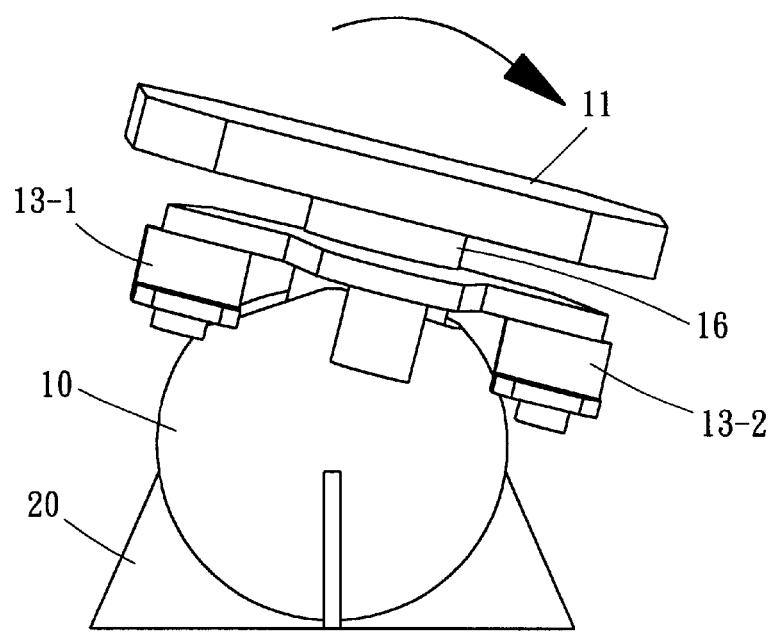
FIG. 8 is a schematic view showing that the ball shaft arm of the present invention cause a right shift key to move.
Figure 9:
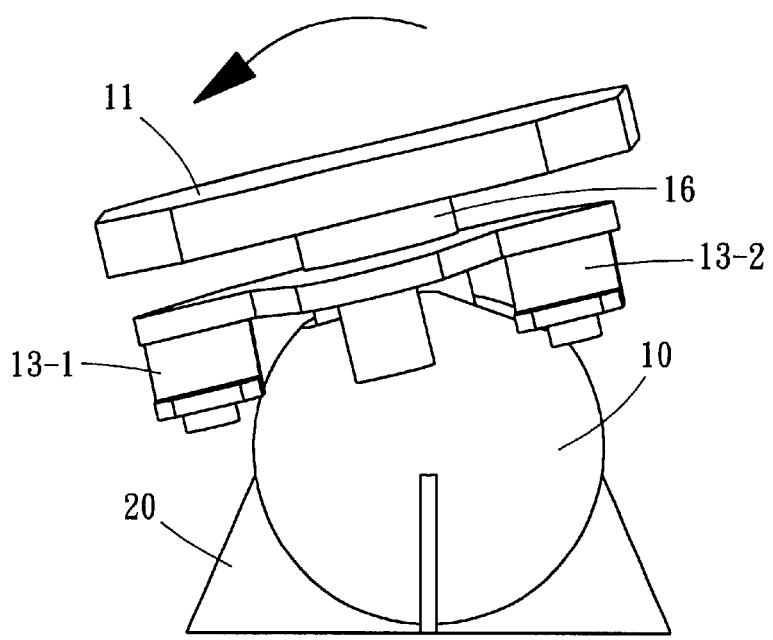
FIG. 9 is a schematic view showing that the ball shaft arm of the present invention moves a left shift key.

Referring to FIGS. 8 and 9, the schematic views of the right shift key and left shift key of the ball shaft type key control element of the present invention are illustrated. The upper cover casing 2 can be shifted with a proper angle according to the practical requirement. Thereby, the ball shaft arm 16 swings in the confinement of the notch 21 installed on the ball shaft seat 10. Thereby, the touching plate 13-1 and touching plate 13-2 touch the key switches 6-1, 6-2 so as to generate the requirement signal of the pointer.

Figure 10:
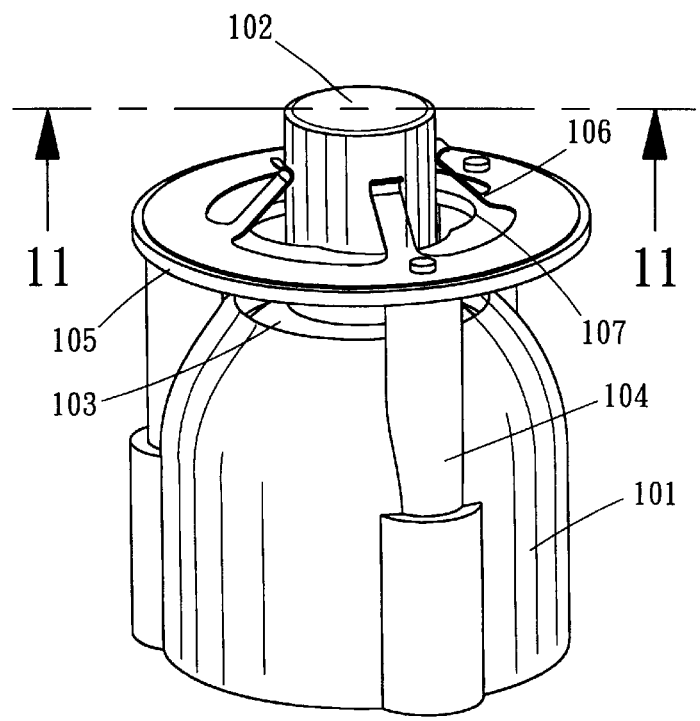
FIG. 10 shows another the present invention of the ball shaft type key control element of the present invention.
Figure 11:
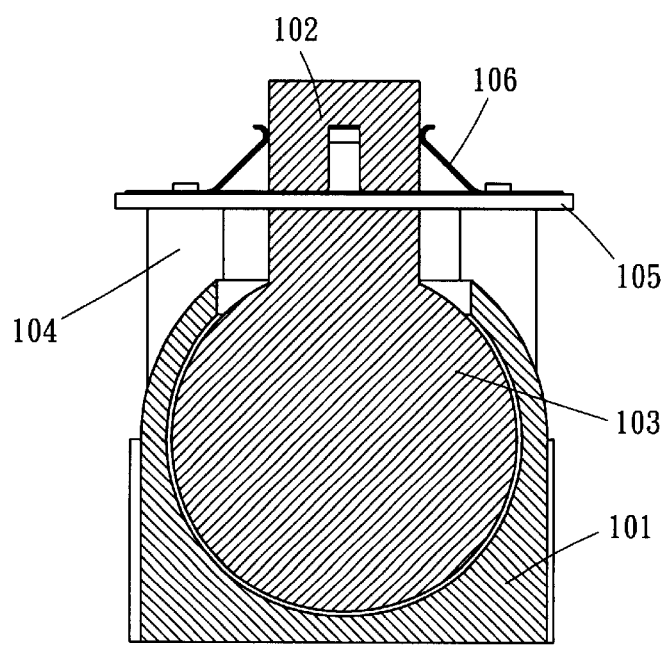
FIG. 11 is a cross section view of the ball shaft type key control element of the present invention.
Figure 12A:
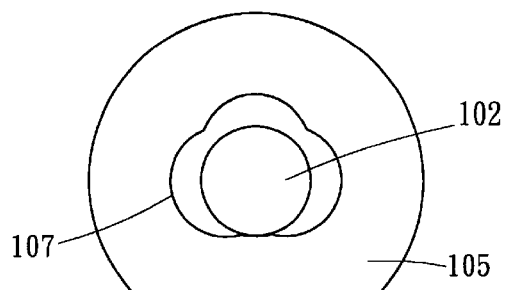
FIGS. 12A, 12B, 12C and 12D are schematic view showing various swinging conditions of the ball shaft arm of the present invention.
Figure 12B:
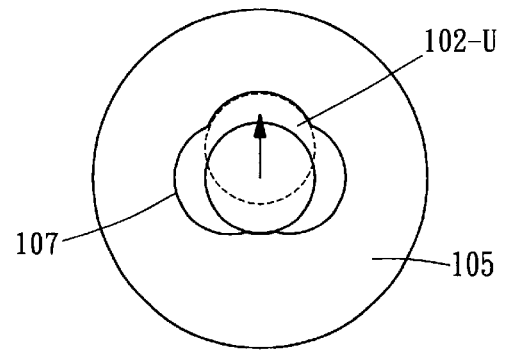
Figure 12C:
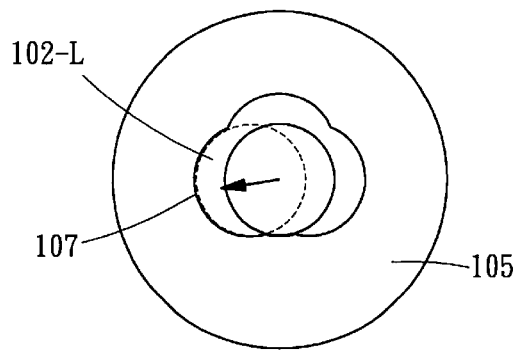
Figure 12D:
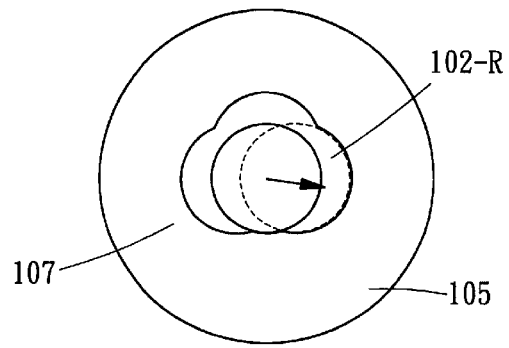

Referring to FIGS. 10 and 11, another embodiment of the ball shaft type key control element of the present invention are illustrated. A ball shaft 103 is properly engaged in the ball shaft seat 101. The ball shaft 103 may rotate freely around the axial center of the ball shaft 103. A notch is formed on the ball shaft seat 101. The round notch of the ball shaft 103 is extended with the post-like ball shaft arm 102 so that the movement of the ball shaft 103 is confined in the ball shaft seat 101 due to the ball shaft arm 102. An elastic bearing seat 105 is installed at a proper position of the ball shaft arm 102. Thereby, the ball shaft arm 102 passes through the swing-confining frame 107 in the elastic bearing seat 105. The elastic bearing seat 105 is fixed to the post 104 so that the ball shaft arm 102 is confined to move only within the swing-confining frame 107.

The elastic bearing seat 105 has a restoring elastic piece 106 for restoring the ball shaft arm 102 to a predetermined position. The restoring elastic piece 106 have a plurality of elastic claws. The claws are installed at positions of maximum swinging within the swing-confining frame 107 and are against the ball shaft arm 102 so that as the ball shaft arm 102 swings around the ball shaft 103, it may restores to the middle position due to the restoring elastic piece 106.

With reference to FIGS. 12A, 12B, 12C and 12D, the movement of the ball shaft arm of the present invention is illustrated. A swing-confining frame 107 with a proper angle is installed on the elastic bearing seat 105 so that the ball shaft arm 102 is confined to swing upwards to a proper angle 102-U by the confinement of the swing-confining frame 107, or to swing leftwards to a proper angle 102-L, or to swing rightwards to a proper angle 102-R. When the ball shaft arm 102 is not shifted by outer force, the ball shaft arm 102 will restore to the initial middle position due to the restoring force of the restoring elastic piece 106.

The key switches 6 and touching plates 13 are installed at proper positions with respect to the shift of the ball shaft arm 102. Thereby, the object of pressing key switches can be achieved by controlling the movement of the ball shaft arm 102.

Figure 1:
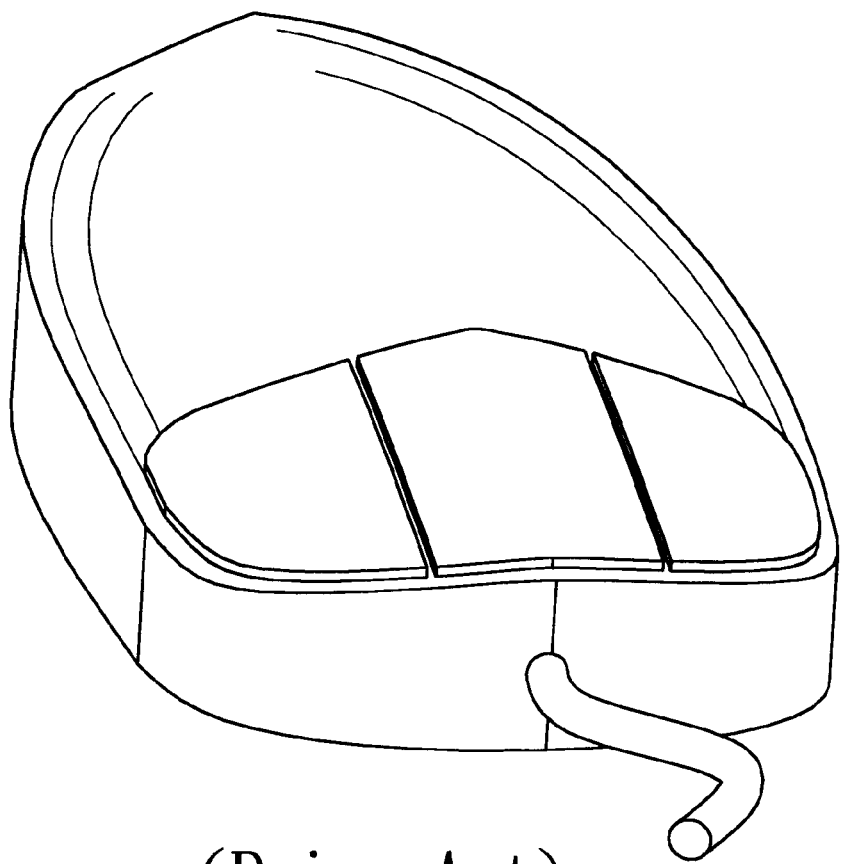
FIG. 1 is a perspective view of a conventional pointer input mouse.
Figure 2:
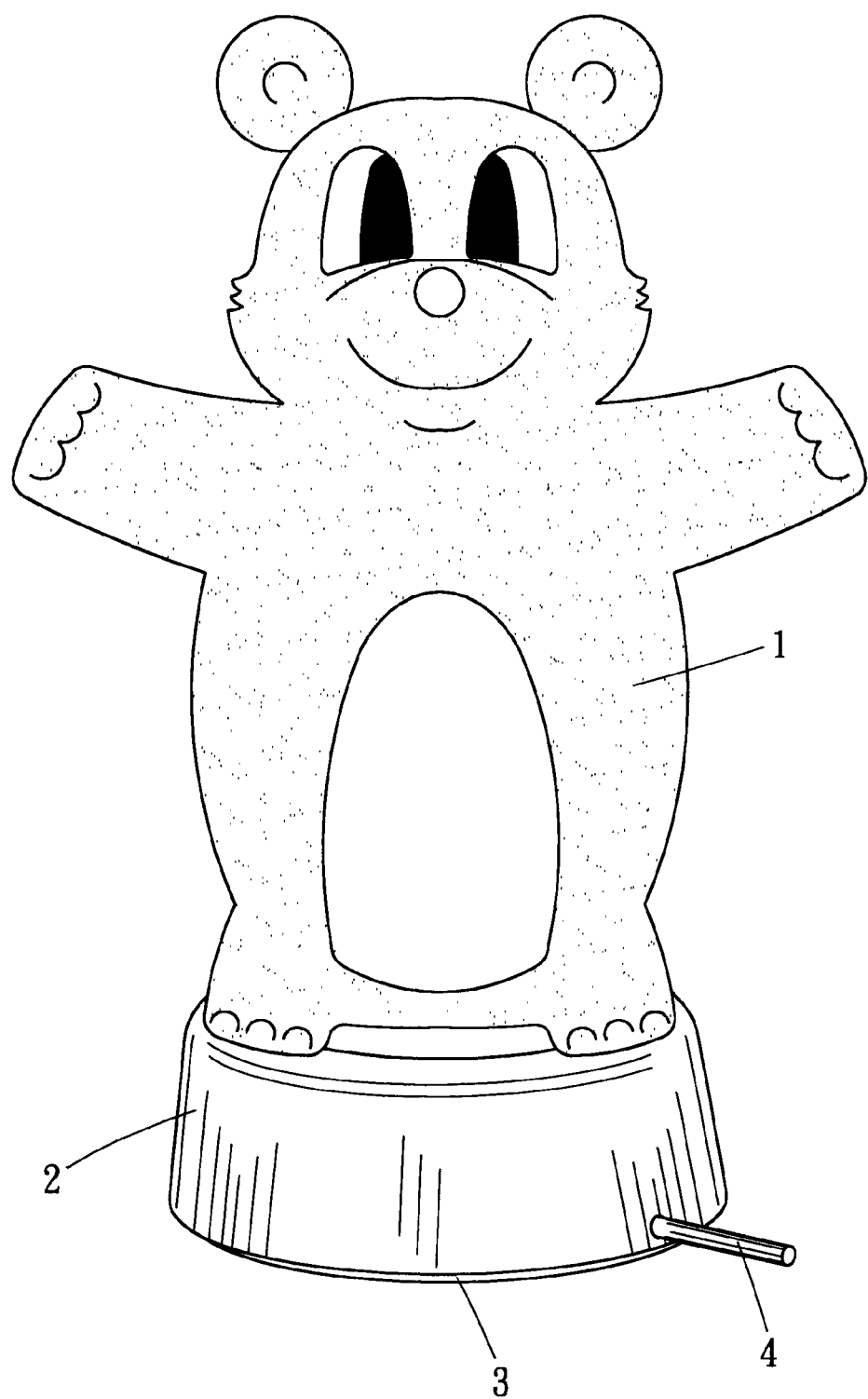
FIG. 2 is a perspective view showing that the keyless pointer input device of the present invention is applied to a decoration.

Since the upper cover casing 2 is fixed to one end of the ball shaft arm 102. In application, the upper cover casing 2 may be properly matched to the decoration 1 so as to form a complete pointer input device, as shown in the FIG. 2.

In the embodiment, different key operation may be generated based on the design angle for the decoration 1 or upper cover casing 2. The designed swinging angle and the way for touching the keys may avoid the mistake during the movement of the pointer device.

Thereby, from above description, by matching of various parts, a keyless pointer input device is formed. Furthermore, the present invention has a compact volume and no key presents on the outlook. The present invention may be matched with a decoration so as to present various interesting outlooks. The dull outlook in the conventional mouse is improved.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A keyless pointer input device with no externally exposed switches comprising:

a) a bottom plate;

b) an upper cover connected to the bottom plate;

c) a main control circuit located on a top of the bottom plate and connected to a signal transmission line;

d) an optical sensor located above the top of the bottom plate for detecting movement of the keyless pointer input device;

e) a ball shaft having a ball shaft arm;

f) a ball shaft seat having a first notch with a predetermined shape and connected to the bottom plate, the ball shaft pivotally positioned in the ball shaft seat with the ball shaft arm extending upwardly from the ball shaft seat such that the first notch defines pivotal movement of the ball shaft;

g) an upper cover fixing piece located on the ball shaft arm on an end opposite the ball shaft and connected to a bottom of the upper cover;

h) a plurality of key switches, each of the plurality of switches being selectively engaged by moving the ball shaft arm with the upper cover; and i) a swing confining frame having a second notch with a pre-determined shape, an elastic bearing seat having a restoring elastic piece with a plurality of claws and connected to the swing confining frame, the second notch positioned around the ball shaft arm and limiting the pivotal movement of the ball shaft arm, and the restoring elastic piece biasing the ball shaft arm to a are-determined location.

2. The keyless pointer input device according to claim 1, wherein the upper cover is formed as a decoration.

3. The keyless pointer input device according to claim 1, further comprising a decoration connected to the upper cover.

4. The keyless pointer input device according to claim 1, further comprising a plurality of touching plates connected to a middle portion of the ball shaft arm, each of the plurality of touching plates removably engaging one of the plurality of switches.

* * * * *